May 24, 1932.  W. S. HADLEY  1,860,147
CLUTCH OR BRAKE LINING
Filed Nov. 14, 1930
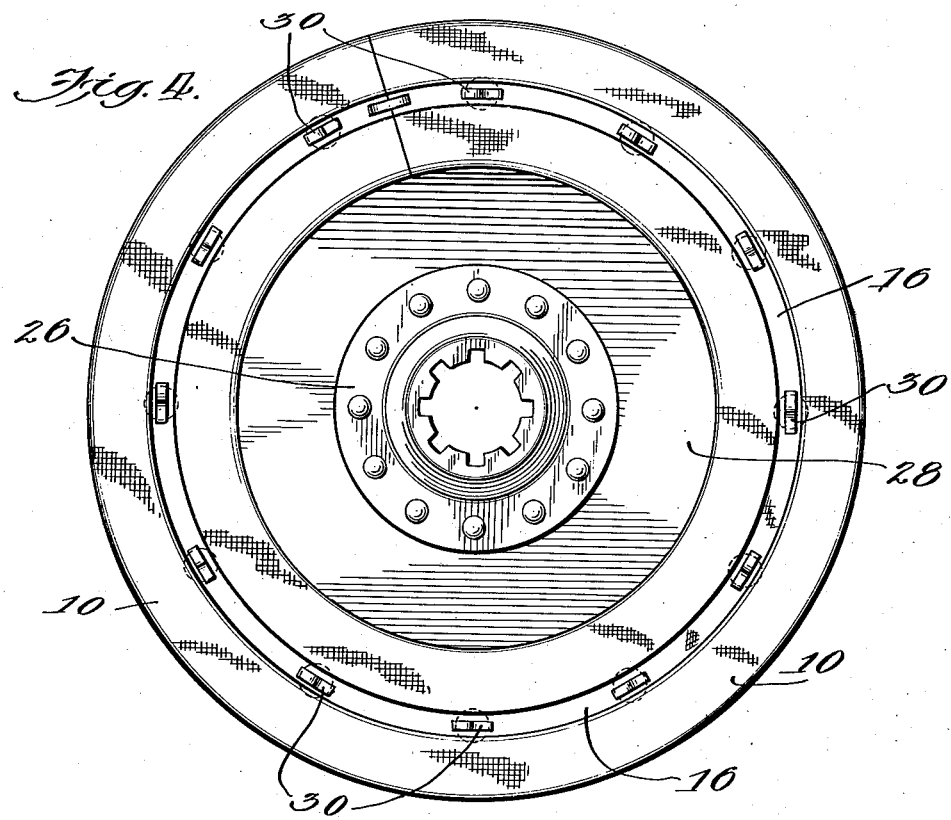
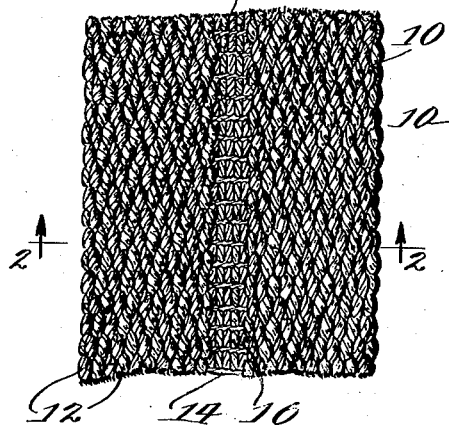
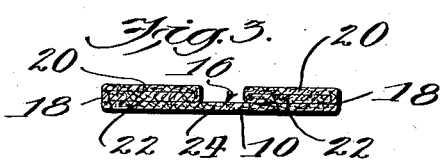
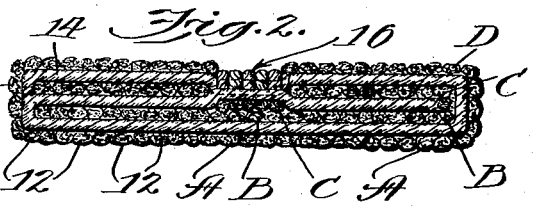
Inventor:
William S. Hadley
By Williams, Bradbury,
McCaleb & Hinkle,
Attys.

Patented May 24, 1932

1,860,147

UNITED STATES PATENT OFFICE

WILLIAM S. HADLEY, OF CHICAGO, ILLINOIS

CLUTCH OR BRAKE LINING

Application filed November 14, 1930. Serial No. 495,564.

My invention relates to brake or clutch linings, and is particularly concerned with the provision of an improved brake or clutch lining capable of operation while immersed or partially immersed in lubricating oil.

The frictional resistance materials used for brake or clutch linings in the past have been designed and constructed to provide a dry frictional engaging action, and the frictional resistive material used in brakes, clutches and the like heretofore has usually been built up of asbestos fibers reinforced or held together with a suitable binder, and usually contains some sort of metal reinforcement. The objections to this type of brake or clutch band are numerous. As the brakes become worn, a "squealing" noise is often produced by the engagement of the bands with the drum. Further, dry clutch or brake bands are known to "grab", and very often operate in a jerky or uneven manner. In wet weather or in driving through water when the dry brake bands now in use are immersed or subjected to considerable wetting, the brakes are rendered inoperative and must be thoroughly dried before they are again operable.

Dry clutch or brake bands are often subjected to severe conditions of temperature. The heat generated sometimes makes the brake drums extremely hot, and the instantaneous temperature at the point of frictional engagement is naturally very high. As a result, despite the fact that asbestos or similar heat resisting fabrics are employed as a braking material, "burning out" of the lining of dry clutches or brake bands is not uncommon. Further, in the use of dry clutch or brake material considerable expense and difficulty is encountered in designing the housings and bearings in the various mechanisms to prevent access of oil to the brake or clutch material.

The general object of my invention is an improved liner for brakes, clutches or the like for use immersed in a lubricant or otherwise supplied with a lubricant.

Among its further objects are the use of a cheaper material; provision for more evenly supplying lubricant throughout a relatively wide face of liner during the actual operation; a unitary or one piece friction liner as distinguished from a built up liner, thereby avoiding stitching, cementing, binder ingredients, raw edges, ripping, and the like, and especially one wherein an oil groove is nevertheless formed; and a liner of the disc ring type so woven that it normally lies flat, while still incorporating such an oil groove.

Other objects and advantages will be more apparent from the following description, in which reference is made to the three sheets of drawings which form a part of the specification.

In the drawings, which illustrate generally some of the uses to which my improved lining may be adapted:

Fig. 1 is an elevational view of a fragment of lining constructed in accordance with my invention;

Fig. 2 is a cross sectional view taken on the line 2—2 of Fig. 1, illustrating one manner in which the groove is provided in the lining;

Fig. 3 is a diagrammatic view similar to Fig. 2, illustrating another manner in which a groove may be provided in the lining; and Fig. 4 is a front elevational view of a disc clutch assembly, the lining thereon being constructed in accordance with my invention.

In carrying out my invention, I have found that the lining may be woven in any desired manner, the principal requirement being the formation of a groove in the wearing face of the lining. To this end, I have shown a strip of lining 10 which comprises the longitudinal threads 12 and the transverse thread 14. The lining 10 is preferably built up by the usual weaving process wherein the transverse strand 14 is alternately positioned below a row of longitudinal threads and above a row of longitudinal threads, and in the present instance a lining has been shown approximately seven strands thick. A groove 16 has been woven into the material upon one face thereof. This has been done in the present instance by leaving out four or five of the longitudinal strands 12 of the fabric at a central point intermediate the sides thereof. For example, at this point only three rows, A, B and C, of the longitudinal strands 12 are provided, whereas throughout the balance of the lining, four rows A, B, C and D of the longitudinal strands are provided. In this manner it can be seen that when the strip of lining is completed, a distinct groove or channel will have been formed in the lining.

In Fig. 3, I have illustrated a modified form of lining 10. In this embodiment of my invention the lining may be of an even thickness throughout and be in the form of a comparatively thin strip. The strip will be an even weave throughout and after the fabric has been woven, the ends 18 are folded inwardly to form the plies 20 and bent outwardly again to form the plies 22. In this position, the plies 20 and 22 may be secured to the back ply 24 by sewing, or in any other desirable or suitable manner. As thus constructed, a trough or groove 16 is formed in the lining. In applying the above described lining to brake drums or to clutch faces, or to any other frictional braking surface, whatever the contour the lining is arranged to be secured thereto by rivets or in any other suitable manner. If the lining is secured by rivets, it is preferable to place the rivets in the groove 16.

In Fig. 4 I have illustrated a clutch disc 26 which may be of any usual type customarily employed in automotive vehicles. The clutch disc is provided with a metallic ring 28 to either side of which a clutch lining 10 is secured by means of the rivets 30 passing through rivet apertures 30' preferably formed in the lining by the application of the rivet itself.

As hereinbefore mentioned, it is desirable to immerse the clutch or brake mechanism, in which my improved lining is embodied, in oil during the operation thereof. As the lining is immersed in oil, a quantity of the oil is retained in the groove 16 and when the lining is pressed against a moving surface to brake the same, the oil in groove 16 is pressed outwardly, lubricating the face of the lining on either side of the groove.

By the use of oil, a cooling fluid is provided against the face of the lining and also a lubricating fluid, and with this construction it is practically impossible to "burn up" a brake lining. Due to the fact that cotton fabric can be employed to form the body of the lining, a comparatively cheap and inexpensive lining may be provided. Because of the fact that the necessity of keeping oil from the brake or clutch lining is eliminated, oil passageways, packings around bearings, oil deflectors, and numerous other devices may be entirely eliminated from clutch assemblies, brakes, etc.

It will be understood that the lining I have described is capable of many other uses besides brakes and clutches, being capable of use wherever a friction material is required, either immersed in oil or not immersed in oil. Where the lining is not immersed in oil in the specific structure in which it is used, provision may be made to supply lubricant to the groove as required.

While I have illustrated preferred embodiments of my invention, it is understood that these are descriptive only and that I am not limited to the detailed constructions set forth except as defined by the appended claims.

I claim:

1. A friction liner for brakes, clutches and the like, comprising an oil impregnated one piece single ply woven strip having a central oil groove woven in its face and spaced rivet apertures through the strip along said groove, whereby the rivet heads may be sunk below the plane of the face.

2. A friction liner for brakes, clutches or the like, comprising an oil impregnated fabric strip woven in single ply and having a longitudinally extending oil groove woven into the face intermediate its edges, the strip being formed by a plurality of superposed layers of warp strands and by transverse strands, a layer of the warp strands being omitted at the region of the groove, whereby the density of the fabric, and consequently its oil absorbing capacity, at the region of the groove remains substantially the same as that of the remaining regions.

In witness whereof, I hereunto subscribe my name this 11th day of November, 1930.

WILLIAM S. HADLEY.